United States Patent [19]

Shih et al.

[11] Patent Number: 5,408,591
[45] Date of Patent: Apr. 18, 1995

[54] AUTOMATIC CALIBRATION AND SERVO CONTROL SCHEME FOR OFFSETTING MECHANICAL AND ELECTRONIC COMPONENT VARIANCES

[75] Inventors: Liang Shih; August D. Coby, both of Brea, Calif.

[73] Assignee: CalComp Inc., Anaheim, Calif.

[21] Appl. No.: 891,573

[22] Filed: Jun. 1, 1992

[51] Int. Cl.⁶ .................. G05B 19/18; G06K 5/00
[52] U.S. Cl. .................. 395/105; 346/139 R
[58] Field of Search .................. 395/105; 346/139 R

[56] References Cited

U.S. PATENT DOCUMENTS 4,567,565  1/1986  Haselby et al. .................. 346/139 R
4,888,710  12/1989  Venthem et al. .................. 346/139 R Primary Examiner—Mark R. Powell
Assistant Examiner—Tracy M. Legree
Attorney, Agent, or Firm—William F. Porter, Jr.; Donald A. Streck

[57] ABSTRACT

In a mechanical device in which a member is moved by an electrical actuator through an electronic and mechanical linkage, apparatus for compensating for changes in system gain to allow precision movement with non-precision components. There a sensor for accurately determining positions of the member, control logic connected to provide a control signal to the actuator, and an adjustable gain control for adjusting the gain of the control signal. Compensation logic is connected to receive positional signals from the sensor, for applying a control signal to the actuator to move the member to a target position closest to a desired final position, for adjusting the gain of the control signal with the adjustable gain control until the member is located at the target position within acceptable tolerance limits, and for then employing that gain to move the member to the desired final position. The method associated with the apparatus can be done in real-time or by pre-calibrating in advance. When pre-calibrating, there is a look-up table containing a plurality of pre-established gains associated with respective ones of a plurality of target positions and the compensation logic selects a gain from the look-up table employs the gain to move the member directly to the desired final position.

12 Claims, 4 Drawing Sheets

AUTOMATIC CALIBRATION AND SERVO CONTROL SCHEME FOR OFFSETTING MECHANICAL AND ELECTRONIC COMPONENT VARIANCES

BACKGROUND OF THE INVENTION

The present invention relates to feedback control calibration for electrically-powered, motion-producing devices and, more particularly, to a method of and apparatus for calibrating electronically driven actuators to offset the cumulative error of poorly toleranced mechanical components and electronic component irregularities by adjusting the gain in the electronic actuator driver circuit in response to feedback derived from positioning a member moved by the actuator to a predetermined position, sensing the actual position, and adjusting the gain in the actuator driver circuit to correct errors in the positioning of the member.

In mechanical devices such as pen plotters, precision linear motion in an electronic actuator such as a voice coil actuator, solenoid, or DC motor is difficult to achieve under changing operating conditions subject to irregularities (non-linear component response and variable gain) in electronic components and cumulative mechanical tolerances. Where precision linear motion is required such as with the up and down movement of a pen-holding apparatus in a pen plotter, previous methods of achieving precision have been limited to using expensive, precision electronic and mechanical components; fine tuning plotter sub-systems; tightly controlling plotter subsystems; and/or utilizing stabilized operating environments. Use of such approaches increases complexity and associated manufacturing costs. Furthermore, they produce a level of precision limited by the individual precision of each element or sub-system in the plotter. Rather than improve the precision incrementally through the use of precision electronic and mechanical components or tuning and controlling, what is needed is a scheme which can continuously offset the cumulative mechanical errors as well as errors due to electronic irregularities. The result would be electronic actuators for pen plotters, and the like, which are simpler and use less expensive components while maintaining consistent precision performance under changing operating conditions.

Various feedback control systems are, of course, well known in many arts. As depicted in FIG. 1, a typical control system 10 involves a controller 12, drive electronics 14, an actuator 16, a mechanical load 18, and a sensor 20. Data required by the controller 12 is maintained in a storage memory 22. The control algorithm utilized can be a proportional plus derivative (PD) control, which can be represented as:

$$U(s) = K_p * (1 + K_d * S) * E(S) \quad (1)$$

where
S is the Laplace operator,
U(S) is the output of the controller,
$K_p$ is the proportional gain,
$K_d$ is the derivative gain,
E(S) is the error signal.
Assuming the drive electronics 14 deliver a current, then the current can be represented as:

$$I(S) = K_a * U(S)$$

where
I(S) is the current output of the drive electronics,
$K_a$ is the gain of the drive electronics
The actuator 16 can be represented as:

$$F(S) = K_t * I(S)$$

where
F(S) is the output force of the actuator,
$K_t$ is the force constant of the actuator.
The mechanical load 18, be it a spring or friction, can be defined as:

$$F(S) - F_d(S) = X(S)/M * S^2$$

where
$F_d(S)$ is a disturbance force (spring force or friction),
X(S) is the mechanical displacement,
M is the inertia.

The latter is represented in FIG. 2. The overall system gain is constituted by the gain of each block. The gain variation of each block will affect the overall system response.

In actual application, the gain of each block will vary due to factors such as thermal effect, the individual consistency of the components, ambient operating conditions, or other environmental factors. For example, the output of a sensor can vary for the same mechanical displacement as depicted in FIG. 3. At a higher temperature, a sensor will have a steeper rate which means a higher gain. Thermal effect can also affect the gain of other electronic components within the system and the tolerances of mechanical components.

Another effect is the variation of the force constant of the actuator. Typically, a lower force constant results when the temperature of the actuator rises. Also, different actuator types have different force constants. For example, a voice coil type actuator's force constant is nearly fixed except near the fully retracted and fully extended stroke positions as depicted in FIG. 4. However, if a solenoid is used, the force constant is a non-linear function of stroke displacement as depicted in FIG. 5.

The aforementioned variations and irregularities each individually contribute to the system's overall electronic gain and affect the overall system performance.

In a system such as the one shown in FIG. 2, the steady state error for controlling the position of an armature of the actuator 16 is inversely proportional to the overall system gain. For a fixed set of hardware, the overall system gain is proportional to the proportional gain $K_p$ of the controller. For different $K_p$, there is a relationship:

$$E_1/E_2 = K_{p2}/K_{p1}$$

where
$E_1 = X_d - X_{1ss}$
$E_2 = X_d - X_{2ss}$
$X_d$ is the desired position (see FIG. 6),
$X_{1ss}$ is the position response of the mechanical system at steady state with the proportional gain equal to $k_{p1}$,
$X_{2ss}$ is the position response of the mechanical system at steady state with the proportional gain equal to $k_{p2}$.

Based on this relationship, the overall system gain can be estimated according to the steady state error measurement in order to maintain the overall system gain at a constant level.

Wherefore it is the object of the present invention to provide an inexpensive and simple calibration scheme to offset inherent system irregularities and inaccuracies, which can be employed to ensure precision linear movement in an electronically driven actuator.

It is the further object of this invention to provide a feedback control scheme adapted to produce precision linear movement which can be employed to advantage in relatively inexpensive mechanical devices such as the pen movement mechanism of a pen plotter.

Other objects and benefits of the invention will become apparent to one skilled in the art from the detailed description which follows hereinafter when taken in conjunction with the drawing figures which accompany it.

SUMMARY

The foregoing objects have been achieved in a mechanical device in which a member is moved by an electrical actuator through an electronic and mechanical linkage, by the apparatus of the present invention for compensating for changes in system gain to allow precision movement with non-precision components comprising, a sensor for accurately determining positions of the member; control logic connected to provide a control signal to the actuator; adjustable gain control means for adjusting gain of the control signal; and, compensation logic means connected to receive positional signals from the sensor for applying a control signal to the actuator to move the member to a target position closest to a desired final position, for adjusting the gain of the control signal with the adjustable gain control means until the member is located at the target position within acceptable tolerance limits, and for then employing that gain to move the member to the desired final position.

Preferably, for pre-calibration implementations, there is also a look-up table containing a plurality of pre-established gains associated with respective ones of a plurality of target positions; wherein, the compensation logic means includes means for selecting a gain from the look-up table associated with a target position closest to a desired final position and for employing the gain from the look-up table to move the member directly to the desired final position.

If desired for additional accuracy, environmental sensor means can be connected to the compensation logic means for providing environmental information about the electrical actuator and electronic and mechanical linkage. In such case, the look-up table contains a plurality of pre-established gains associated with respective ones of the plurality of target positions for a plurality of environmental states determinable by the environmental sensor means and the means for selecting a gain from the look-up table includes means for selecting a gain from the look-up table associated with one of the plurality of environmental states presently being determined by the environmental sensor means.

DESCRIPTION OF THE PREFERRED EMBODIMENT

As described above under the Background of the Invention, the main object of this invention is to provide a way in which precision control to an acceptable level can be attained in a mechanical mechanism driven by an electrically-powered actuator such as a solenoid without the need to employ precision mechanical parts and electronic components throughout. While the example presented hereinafter is that of the pen raising and lowering mechanism of a pen plotter as actuated by a solenoid actuator, those skilled in the art will appreciate that the same technique could be employed in other aspects of a pen plotter as well as in other mechanical devices using such actuators operating through mechanical linkages which inject positional errors into the resultant movement. Thus, the bread to be accorded to the claims appended hereto should be in accordance with the scope and spirit of the invention as disclosed and not be limited to the specific example.

It should also be noted that the inventors herein do not claim to have invented feedback control loops per se. Only the specific application thereof in the manner described within the limited environment of pen plotters and similar devices in which feedback control has not previously been incorporated to solve the particular problem of cumulative component error.

Figure 7:
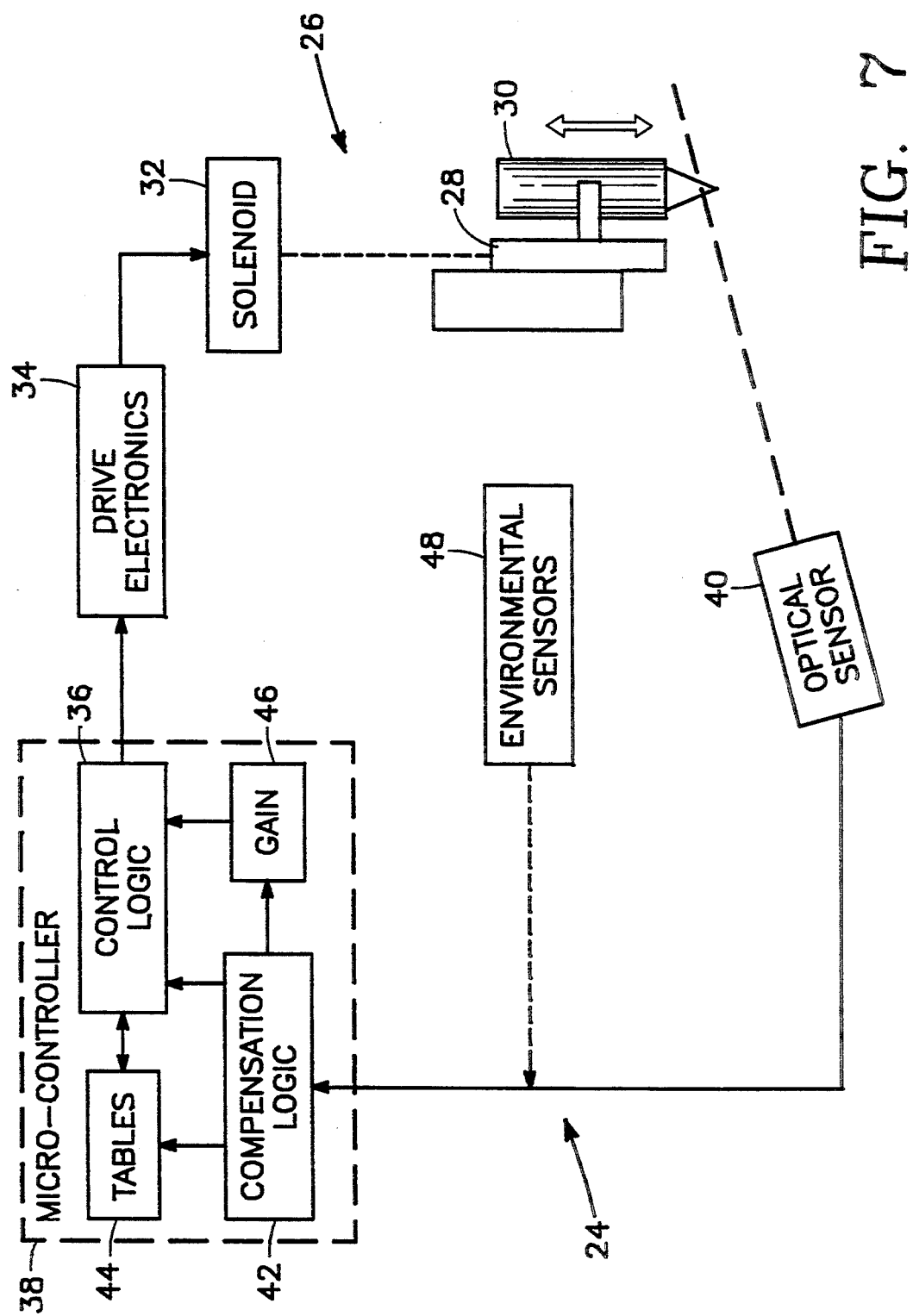
FIG. 7 is a diagram representing the preferred embodiment of the present invention.
Figure 8:
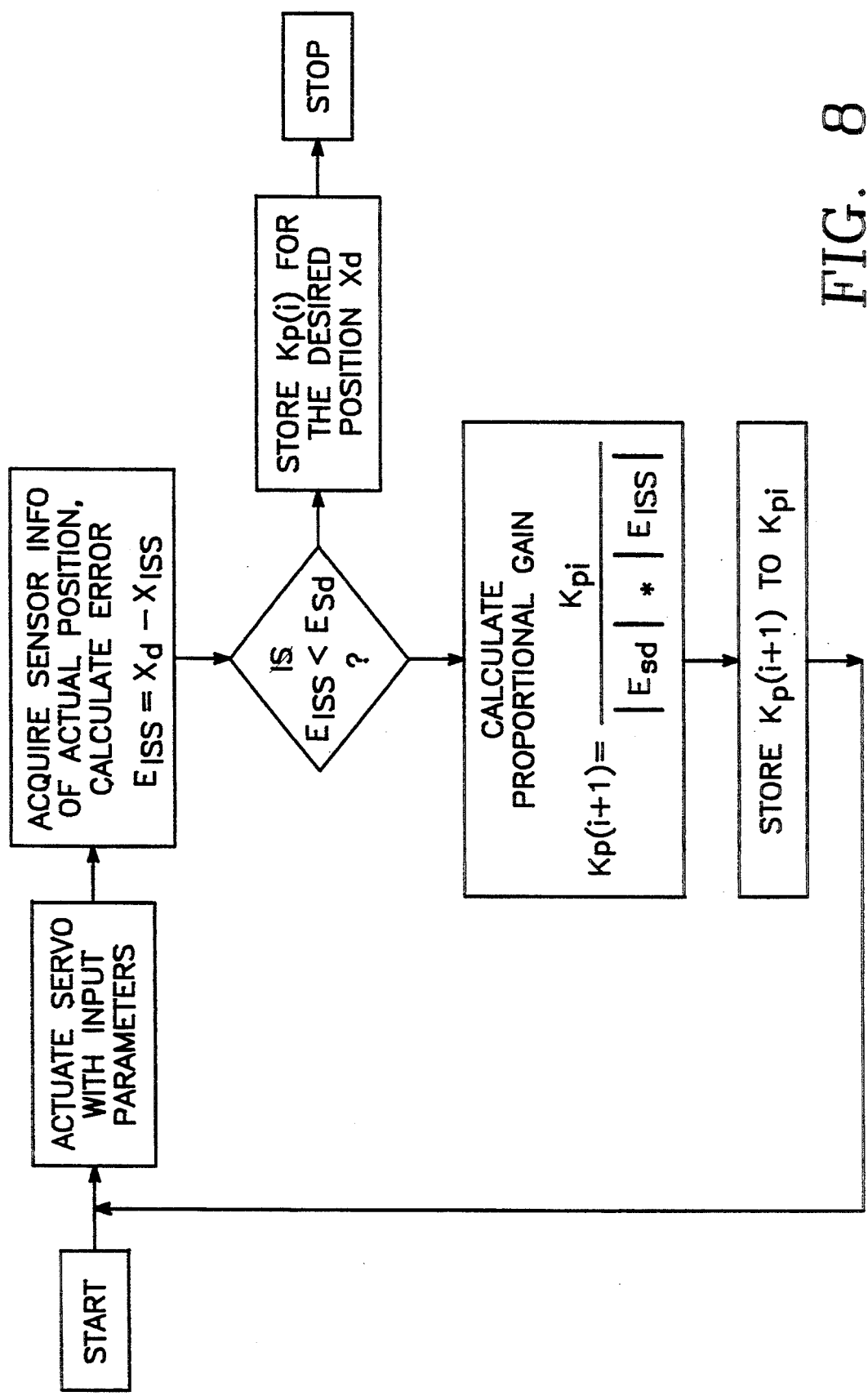
FIG. 8 is a flow chart depicting the gain adjustment process employed in the present invention.

A solenoid-based actuating system which automatically calibrates to offset mechanical and electronic irregularities according to the present invention is shown in FIG. 7 where it is generally indicated as 24. As those skilled in the art will quickly recognize and appreciate, the objects of the present invention in providing precision positional movement are accomplished employing a solenoid actuator 26 which moves a pen up/down mechanism 28 carrying a pen 30. The coil 32 of the solenoid actuator 26 is connected to drive electronics 34 which provide variable current to the coil 32 as a function of a control signal from the control logic 36 contained within the micro-controller 38. The position of the pen up/down mechanism 28 can be measured and accurately determined by an optical sensor 40 which is connected to send positional feedback signals to the compensation logic 42 which can then be stored to look-up tables 44 in a random access memory. According to this invention, the gain 46 is adjusted by the compensation logic 42 in the manner to be described hereinafter. The gain 46 is input to the control logic 36 and determines the signal gain applied to the solenoid actuator 26. In this way, the proper current can be applied to the coil 32 of the solenoid actuator 26 to achieve the desired positional movement thereof with precision. The cumulative errors of the electronics and mechanical linkages are automatically adjusted for to achieve the desired position.

As will be appreciated, the present invention and its method of compensation can be accomplished by a precalibration process and/or in real time during operation. The way in which it is implemented will be, in great part, a function of the computational capabilities of the micro-controller 38 which is employed. In a real time implementation, the solenoid actuator 26 is used to move the pen up/down mechanism 28 to a target position close to the desired position where the sensor 40 can measure the actual position achieved and provide that information to the compensation logic 42. The compensation logic 42 can then adjusts the gain 46 until the target position is achieved. The pen up/down mechanism 28 can then be moved to the adjacent desired position by the solenoid actuator 26 employing that gain and thereby achieve acceptable positional accuracy. Where pre-calibration according to the present invention is implemented, the same technique of using the solenoid actuator 26 to move the pen up/down mechanism 28 to a sensible target position where the sensor 40 can measure the actual position achieved is employed. The compensation logic 42 adjusts the gain 46 until the target position is achieved. The gain value for that target position is then stored in the look-up tables 44. This is repeated for all the target positions. At run time, when the pen up/down mechanism 28 is to be moved to a particular position, the gain for the closest target position from the look-up tables 44 is retrieved and employed as the pen up/down mechanism 28 is moved directly to its desired position with the same acceptable precision.

The iterative process to implement the calibration scheme is as follows:

(A) Given:
  a. the desired position ($X_d$)
  b. the initial position ($X_i$)
  c. the desired steady state error ($E_{sd}$)
  d. the initial proportional gain $K_p(i)$
  e. the derivative gain ($K_d$)

(B) Move the pen up/down mechanism to the desired position $X_d$ in accordance with the parameters given in (A).

(C) Acquire the actual position ($X_{1ss}$) from the optical sensor output and calculate
the actual steady state error ($E_{1ss}$):

$$E_{1ss} = X_d - X_{1ss}$$

(D) Check to see if the absolute value of the actual steady state error is less than the absolute value of the desired steady state error (acceptable steady state error).

$$abs(E_{1ss}) < abs(E_{sd})$$

where: abs is the absolute value operator If the actual steady state error ($E_{1ss}$) is less than the acceptable error ($E_{sd}$), then go to step (G). If the actual steady state error has a greater value than the acceptable steady state error, then go to step (E).

(E) Calculate the proportional gain $K_p(i+1)$ for the next iterative attempt using the equation:

$$K_p(i+1) = K_p(i)/abs(E_{sd}) * abs(E_{1ss})$$

go to step (F)

(F) Store $K_p(i+1)$ to $K_{pi}$, and repeat the procedure from step (A).

(G) Store $K_p(i)$ for the desired position $X_d$.

As stated above, the scheme can be used either on-line or off-line. For off-line calibration, the calibration results are stored in the look up table 44 for real time implementation. For on-line application, the scheme is implemented in real time. While the example given is for a pen raising and lowering mechanism in a pen plotter, the same approach can be employed with longer mechanical linkages and component streams. All that is required is an accurate positional sensor to determine the position of the moved member at the various target positions which set the gain to be employed for moving to destination areas around the target positions. The number of target positions (and, therefore, entries in the look-up tables 44 for a pre-calibration implementation) is, of course, a function of the cumulative error in the system between the actuator and the moving member, the distance moved, and the accuracy desired. The type of positional sensor is not critical and many positional sensors are known to those of ordinary skill in the art and commercially available.

Figure 1:
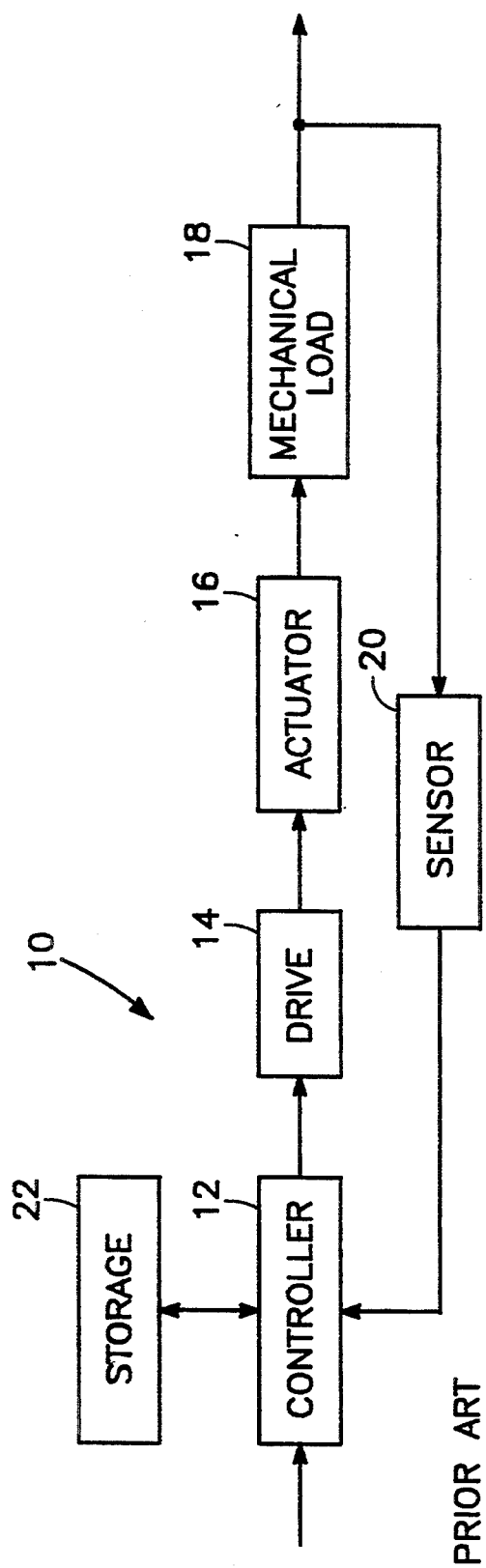
FIG. 1 is a simplified diagram of a feedback control system.
Figure 2:
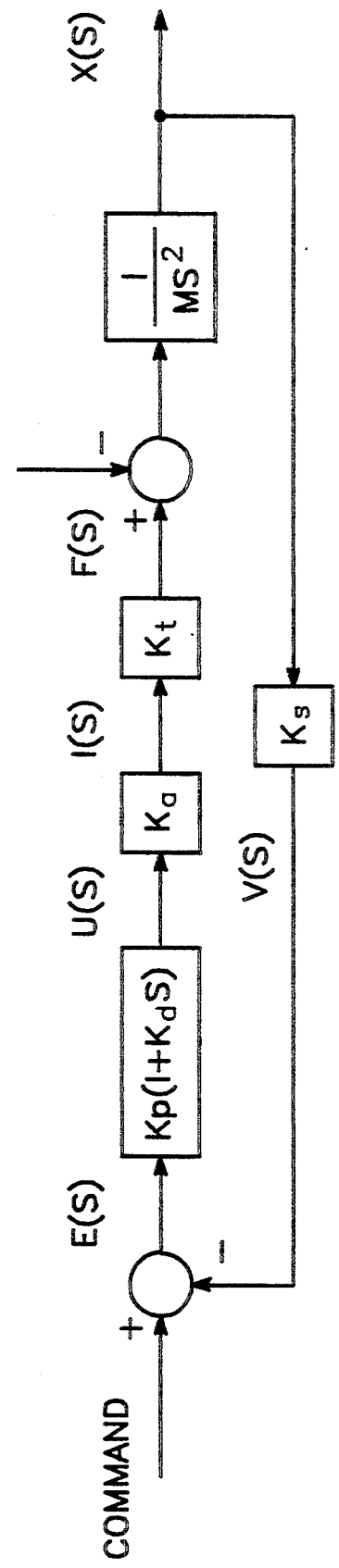
FIG. 2 is a block diagram representing the component gain variables.
Figure 3:
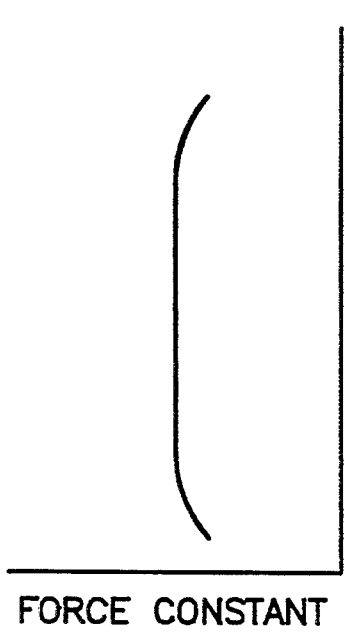
FIG. 3 is a graph depicting the variation in sensor output versus detected/mechanical displacement for different sensor operating temperatures.
Figure 6:
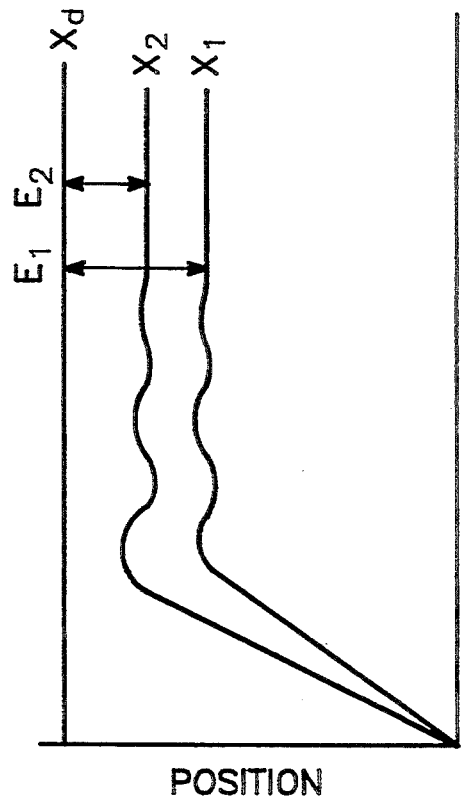
FIG. 6 is a graph depicting the differences between actual and desired armature positions versus time as the system achieves a steady state operating condition.
Figure 4:
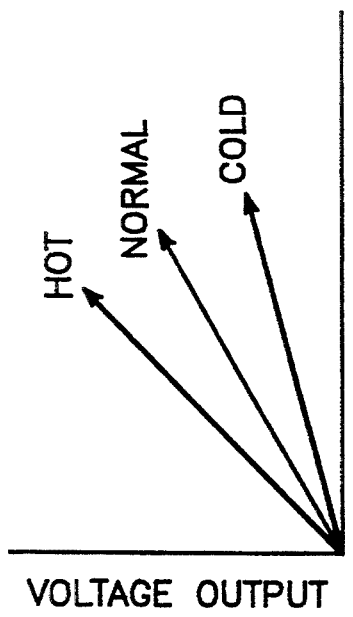
FIG. 4 is a graph depicting the relationship between the operating force constant in a voice coil actuator versus actuator armature displacement.
Figure 5:
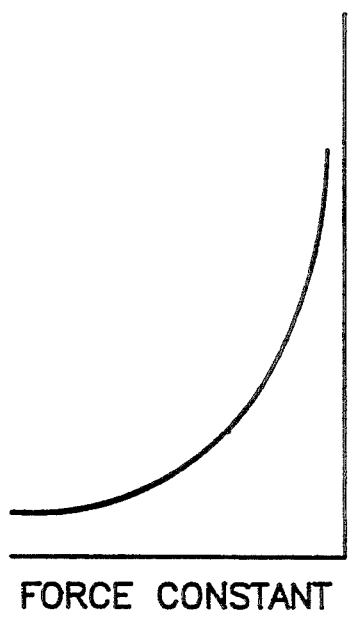
FIG. 5 is a graph depicting the relationship between the operating force constant in a solenoid actuator versus actuator armature displacement.

Additionally, as depicted in FIG. 7, for pre-calibration implementations one can also add environmental sensors 48 as shown in ghosted connection to the compensation logic 42. For example, a thermistor or other type of temperature measuring sensor could be employed to see if the coil 32 of the solenoid actuator 26 is hot, normal, or cold as depicted in FIG. 3. The gain values in the look-up tables 44 could then be maintained for all three conditions. At plot time, the correct gain for the present temperature state of the coil 32 could then be employed for even greater accuracy.

Thus, it can be seen that this invention meets its stated objects by providing a way in which low tolerance and low cost electrical and mechanical components can be employed in apparatus such a pen plotters without having to give up reasonable levels of precision performance.

Wherefore, having thus described the present invention, what is claimed is:

1. In a mechanical device in which a member is moved by an electrical actuator through an electronic and mechanical linkage, apparatus for compensating for changes in system gain to allow precision movement comprising:
  a) a sensor for accurately determining positions of the member;
  b) control logic connected to provide a control signal to the actuator;
  c) adjustable gain control means for adjusting gain of said control signal; and,
  d) compensation logic means connected to receive positional signals from said sensor for applying a control signal to the actuator to move the member to a target position closest to a desired final position, for adjusting said gain of said control signal with said adjustable gain control means until the member is located at said target position within an acceptable positional accuracy, and for then employing that gain to move the member to said desired final position.

2. The apparatus of claim 1 and additionally comprising:
  a) look-up table means containing a plurality of pre-established gains associated with respective ones of a plurality of target positions; wherein, b) said compensation logic means includes means for selecting a gain from said look-up table means associated with a target position closest to a desired final position and for employing said gain from said look-up table means to move the member directly to said desired final position.

3. The apparatus of claim 2 and additionally comprising:

a) environmental sensor means connected to said compensation logic means for providing environmental information about the electrical actuator and electronic and mechanical linkage; wherein, b) said look-up table means contains a said plurality of pre-established gains associated with respective ones of said plurality of target positions for a plurality of environmental states determinable by said environmental sensor means; and, c) said means for selecting a gain from said look-up table means includes means for selecting a gain from said look-up table means associated with one of said plurality of environmental states presently being determined by said environmental sensor means.

4. In a pen plotter in which a member is moved between multiple positions by an electrical actuator through a mechanical linkage, apparatus for compensating for changes in system gain to allow precision movement comprising:

a) a sensor for accurately determining positions of the member;

b) control logic connected to provide a control signal to the actuator;

c) adjustable gain control means for adjusting gain of said control signal; and, d) compensation logic means connected to receive positional signals from said sensor for applying a control signal to the actuator to move the member to a target position closest to a desired final position, for adjusting said gain of said control signal with said adjustable gain control means until the member is located at said target position within an acceptable positional accuracy, and for then employing that gain to move the member to said desired final position.

5. The apparatus of claim 4 wherein:

a) the member is a pen raising and lowering mechanism; and, b) the actuator is a solenoid actuator.

6. The apparatus of claim 4 and additionally comprising:

a) look-up table means containing a plurality of pre-established gains associated with respective ones of a plurality of target positions; wherein, b) said compensation logic means includes means for selecting a gain from said look-up table means associated with a target position closest to a desired final position and for employing said gain from said look-up table means to move the member directly to said desired final position.

7. The apparatus of claim 6 and additionally comprising:

a) environmental sensor means connected to said compensation logic means for providing environmental information about the electrical actuator and electronic and mechanical linkage; wherein, b) said look-up table means contains a said plurality of pre-established gains associated with respective ones of said plurality of target positions for a plurality of environmental states determinable by said environmental sensor means; and, c) said means for selecting a gain from said look-up table means includes means for selecting a gain from said look-up table means associated with one of said plurality of environmental states presently being determined by said environmental sensor means.

8. In a pen plotter in which a member is moved between multiple positions by an electrical actuator through a mechanical linkage, a method for compensating for changes in system gain to allow precision movement comprising the steps of:

a) providing a sensor for accurately determining positions of the member;

b) connecting control logic to provide a control signal to the actuator;

c) providing adjustable gain control means for adjusting gain of said control signal;

d) applying a control signal to the actuator to move the member to a target position closest to a desired final position;

e) adjusting said gain of said control signal with the adjustable gain control means until the member is located at the target position within an acceptable positional accuracy; and, f) employing that gain to move the member to said desired final position.

9. The method of claim 8 and additionally comprising the steps of:

a) providing a look-up table containing a plurality of pre-established gains associated with respective ones of a plurality of target positions;

b) selecting a gain from the look-up table associated with a target position closest to a desired final position; and, c) employing the gain from the look-up table to move the member directly to the desired final position.

10. The method of claim 9 and additionally comprising the steps of:

a) sensing environmental information about the electrical actuator and mechanical linkage;

b) including a plurality of pre-established gains associated with respective ones of a plurality of target positions for a plurality of environmental states in the look-up table; and, c) selecting a gain from the look-up table associated with one of the plurality of environmental states existing at the time the member is moved.

11. In a pen plotter in which a member is moved between multiple positions by an electrical actuator through a mechanical linkage, a method for compensating for changes in system gain to allow precision movement comprising the steps of:

a) providing a sensor for accurately determining positions of the member;

b) connecting control logic to provide a control signal to the actuator;

c) providing adjustable gain control means for adjusting gain of said control signal;

d) providing a look-up table for containing a plurality of pre-established gains associated with respective ones of a plurality of target positions;

e) prior to plotting, pre-calibrating the look-up table by, e1) applying a control signal to the actuator to move the member to a target position closest to a desired final position, e2) adjusting said gain of said control signal with the adjustable gain control means until the member is located at the target position within an acceptable positional accuracy, e3) storing the gain in the look-up table for its associated target position, and e4) repeating steps (e1) through (e3) for each of the plurality of target positions; and, f) at a time of plotting, f1) selecting a gain from the look-up table associated with a target position closest to a desired final position, and f2) employing that gain from the look-up table to move the member to said desired final position.

12. The method of claim 11 and additionally comprising the steps of:

a) sensing environmental information about the electrical actuator and mechanical linkage;

b) including a plurality of pre-established gains associated with respective one of a plurality of target positions for a plurality of environmental states in the look-up table; and, c) selecting a gain from the look-up table associated with one of the plurality of environmental states existing at the time the member is moved.

* * * * *